United States Patent [19]

Williams et al.

[11] Patent Number: 5,649,858
[45] Date of Patent: Jul. 22, 1997

[54] APPARATUS FOR SLITTING CASING SURFACES AND PEELING THE CASINGS FROM A CHAIN OF SAUSAGES AND THE LIKE

[75] Inventors: Jeffrey A. Williams, Calhoun, Ga.; Charles E. Miller, West Point, Miss.

[73] Assignee: Sara Lee Corporation, Winston-Salem, N.C.

[21] Appl. No.: 556,174

[22] Filed: Nov. 9, 1995

[51] Int. Cl.$^6$ ................................................. A22C 11/00
[52] U.S. Cl. ................................................. 452/50
[58] Field of Search ................................................. 452/50

[56] References Cited

U.S. PATENT DOCUMENTS

| | | | |
|---|---|---|---|
| 3,312,995 | 4/1967 | Garey | 452/50 |
| 3,487,499 | 1/1970 | Klyce | 452/50 |
| 4,118,828 | 10/1978 | Melanson | 452/50 |
| 4,414,707 | 11/1983 | Koken | 452/50 |

*Primary Examiner*—Willis Little
*Attorney, Agent, or Firm*—Petree Stockton, L.L.P.

[57] ABSTRACT

A quick assembly/disassembly apparatus for splitting casing surfaces and peeling the cases from a string of sausages or the like which includes a trackway along which the sausage chain moves and driving discs that engage the casing covered chain of sausages and moves it along the trackway. A contour follower slitting blade is urged with a preselected amount of pressure against the skin casing of the moving chain of sausages and cuts the casing a precise amount to enable it to be thereafter loosened from the sausage by a stream of compressed air. A limiting pin prevents the slitting blade from displacement from the casing surface when the blade encounters a new casing to be split or other surface irregularities. Compressed air is directed against the split casings to urge the skin casings away from the sausages, and a vacuum assists an additional pair of driving discs to cooperatively engage the slit casings and move the casings to a remote location.

11 Claims, 5 Drawing Sheets

APPARATUS FOR SLITTING CASING SURFACES AND PEELING THE CASINGS FROM A CHAIN OF SAUSAGES AND THE LIKE

BACKGROUND OF THE INVENTION

1. Field of the Invention

This invention relates to apparatus for removing the casings of sausages and more particularly to an apparatus for slitting casing surfaces, peeling the casings from a chain of sausages, and removing the slit casings to a remote location.

2. Description of the Prior Art

It is well-known that sausages are manufactured as a continuous string, the individual lengths of each sausage being separated by a ligature or a twisted portion of the continuous tube of casing material within which the meat of the sausage is disposed. After formation of the string of sausages, they are subject to various processes such as curing or smoking. Thereafter, the individual sausages are separated. One technique for separating sausages which are sold in skinless form is to remove the casings. Since the casings are made up of a continuous tube of casing material, removal of the casing will result directly in separation of the individual sausages.

The most commonly adopted technique to accomplish separation is to cause the sausages to move as a string against a slitting knife which forms a longitudinal slit in the casing and thereafter to cause the string with the slit casing to pass across a perforated wheel, the interior of which is exposed to a vacuum. Thus, the casings are drawn across the wheel as the wheel rotates while the individual sausages pass tangentially beyond the wheel. Typical of such arrangement is that described in U.S. Pat. No. 3,312,995 issued Apr. 11, 1967, the contents of which are incorporated herein by reference.

Another technique in treating sausages and the like is to provide a sausage peeling apparatus having a path of travel for a string of sausages, a knife assembly and a vacuum wheel which is effective to remove slit casings from the sausages. In such an arrangement, there is provided a guide element for guiding the sausages relative to the knife assembly which affects the longitudinal slitting process and in which the guide assembly includes an insert which can be removed and replaced to accommodate different sizes of sausages. Such an apparatus is shown in U.S. Pat. No. 4,118,828 issued Oct. 10, 1978, the contents of which are also incorporated herein by reference.

A major problem in the industry has been the handling of sausages of different sizes which cover a considerable range. Other problems are associated with the complexity of prior art devices which has tended to render the disassembly of the equipment for cleaning purposes extremely difficult.

It is therefore an object of the present invention to provide an apparatus for peeling sausages in a consistent manner utilizing blade tensioning and movement restricting means to consistently split the casings and to provide an apparatus which is simple and easily assembled and disassembled for servicing and cleaning purposes.

SUMMARY OF THE INVENTION

The present invention is a sausage peeling apparatus wherein its components form a trackway for a string of sausages, a knife assembly, and removing and vacuum means which are effective to remove slit casings from the sausages. The blade is critically controlled for pressure and displacement from the casing surface by controlled means thereby ensuring consistency in the longitudinal slitting process. Driving discs of differing speeds are provided to move the string of sausages along the trackway and through the slitting area. Thereafter the slit casings are engaged by an additional driving element which rotates at a greater speed than the rotational speeds of the first and second pair of driving elements and together with a vacuum source remove the slit casings to a remote location.

Thus, there has been outlined the more features of the invention in order that the detailed description that follows may be better understood and in order that the present contribution to the art may be better appreciated. There are, of course, additional features of the present invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways. It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention of the application, which is measured by its claims, nor to limit its scope in any way.

Thus the objects of the invention previously set forth along with the various features of novelty which characterize the invention are noted with particularity in the claims annexed to and forming a part of this disclosure. For a better understanding of the invention, its operating advantages and the specific results obtained by its use, reference should be made to the following detailed specification taken in conjunction with the accompanying drawings wherein like characters of reference designate like parts throughout the several views.

DETAILED DESCRIPTION OF THE PREFERRED EMBODIMENT

Figure 1:
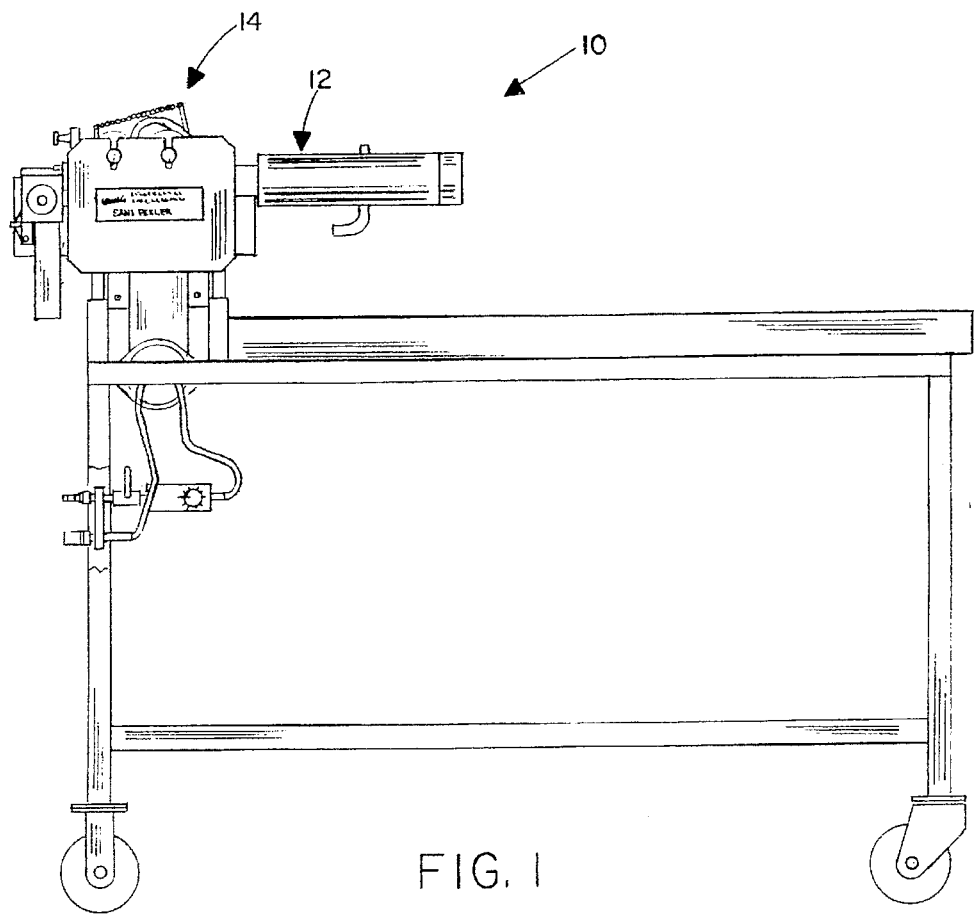
FIG. 1 is a front elevational view of the casing slitting apparatus.
Figure 2:
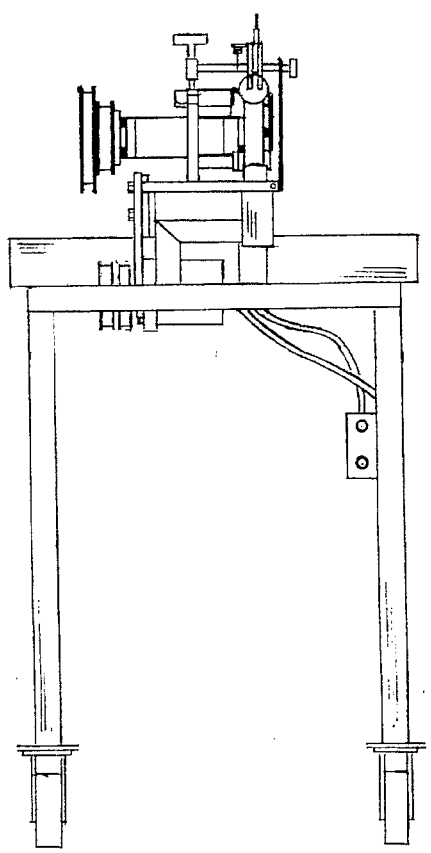
FIG. 2 is an end elevational view of the apparatus shown in FIG. 1.

Referring now to the drawings and particularly to FIG. 1, the peeling apparatus shown generally as 10 comprising the present invention includes a steam chamber 12 through which is passed a string of sausages or the like so that the application of steam will begin loosening the casing about the sausage for subsequent removal. A driving mechanism shown generally as 14 is made up of a first husking wheel 16 cooperatively receiving the sausages and urging the string of sausages along the trackway formed thereby. The driving means 14 also includes a second husking wheel 18 which also cooperatively receive the string of sausages and urge the string onwardly in the trackway. It has been found advantageous to rotate second wheel 18 at a slightly greater speed than the rotational speed of first wheel 16, preferably about 10% faster than wheel 16.

A slitting assembly shown generally as 20 includes slitting blade 22 pivotally connected at junction 24 so that blade tip 26 engages the surface of the sausage casing and thereby enables the slitting operation to take place. The slitting assembly 20 also includes a tensioning device 28 enabling the application of a preselected amount of pressure to the blade thereby ensuring an even and consistent cut in the sausage casing. A pin 30 limits lower and upper knife travel through upper stop adjustment knob 42 and lower stop adjustment knob 43 when the blade engages an uneven casing surface or when it senses a separation between sausages and tends to rebound therefrom.

An additional driving means includes a vacuum wheel 32 positioned in the flow path of a suction which cooperatively engage the slit casings and move them through an exit conduit 34 to a remote location. The additional driving discs 32 are driven at a rotational speed greater than the speeds of discs 16 and 18, preferably at about a 10% greater speed than the rotational speed of discs 18.

Idler wheels 38 are located above the first and second pair of driving discs 16, 18 to maintain the chain of sausages in close proximity to those driving discs. Thus, the path of travel of the string of connected sausages becomes a trackway extending through the steam chamber 12 between driving disc 16 and idler 38 against knife blade tip 26 and between driving disc 18 and idler 38. It continues thereafter to driving disc 32 and is induced by a suction source pulling the slit casing through the exit conduit 34.

The various driving discs are powered by a motor 40 suitably connected to impart the desired rotational speeds through the various pairs of driving discs.

Figure 3:
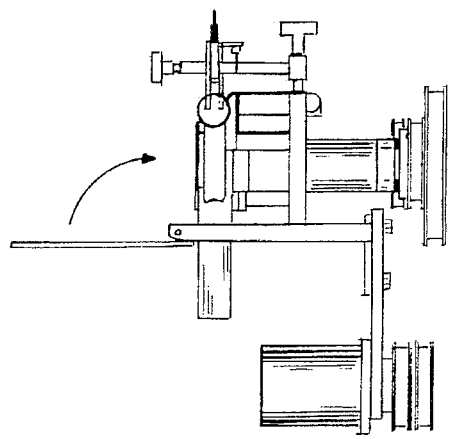
FIG. 3 is an end elevational schematic view of the hold down assembly fastened by fingernuts.
Figure 4:
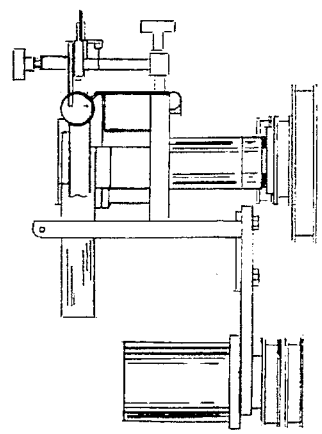
FIG. 4 is an end elevational schematic view of the apparatus shown in FIG. 3 wherein the hold down assembly has been released and lifted partially upwardly.
Figure 5:
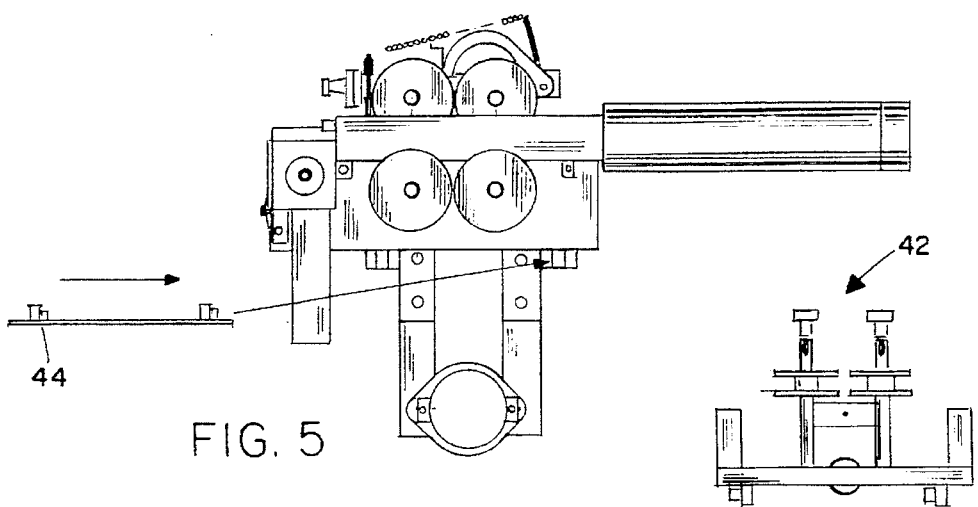
FIG. 5 is a front elevational view of the apparatus shown in FIGS. 3 and 4 with the hold down assembly detached.
Figure 6:
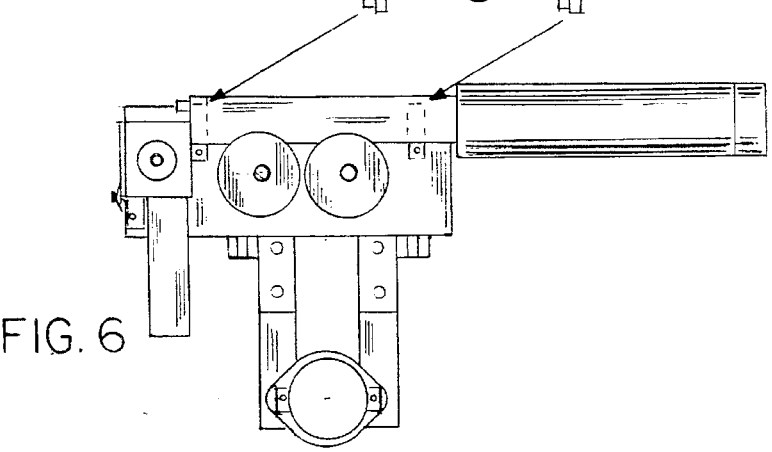
FIG. 6 is a front elevational view of the apparatus shown in FIG. 5 with the hold down assembly and front plate removed.
Figure 7:
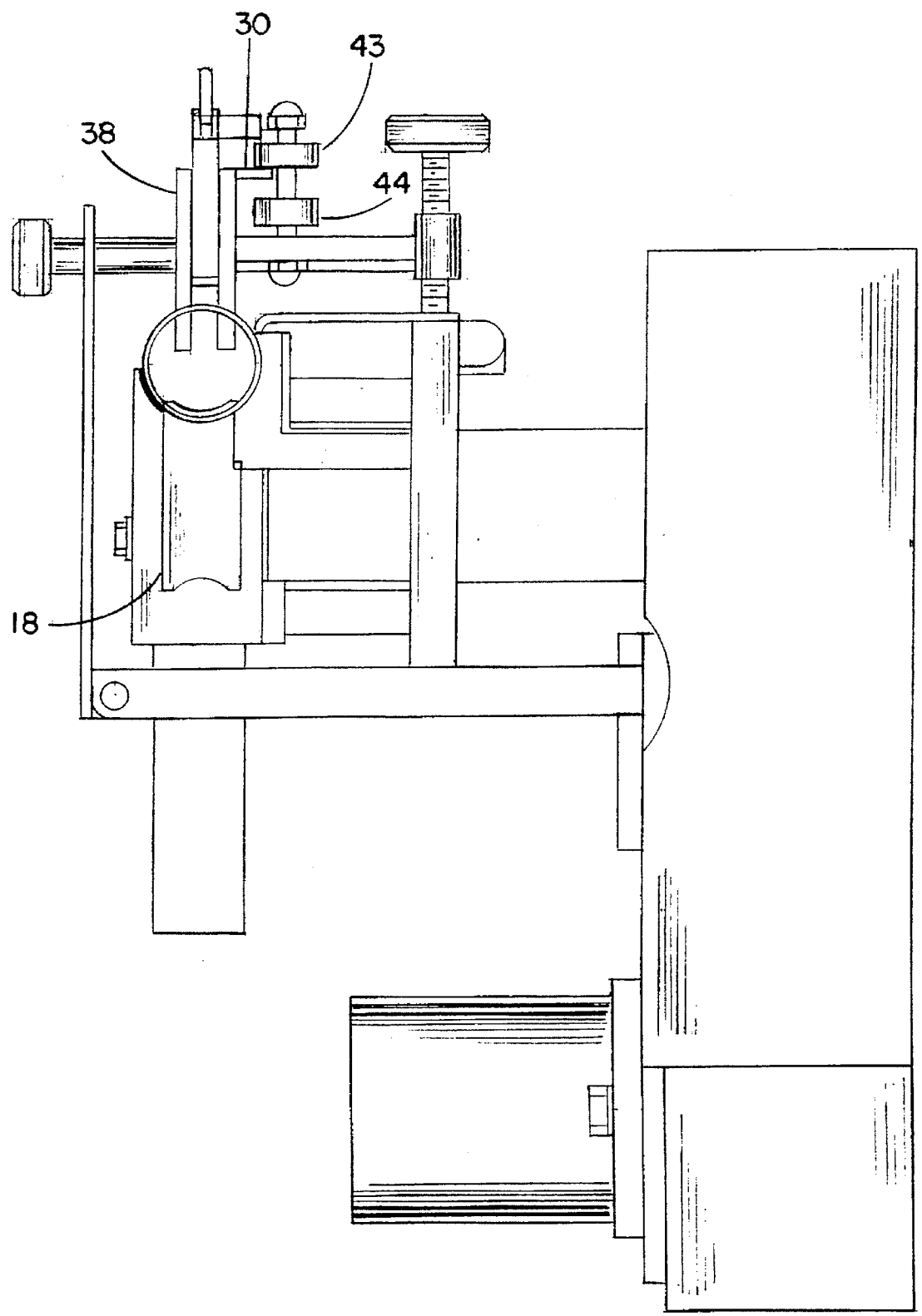
FIG. 7 is an end elevational and enlarged view of the apparatus comprising the present invention.
Figure 8:
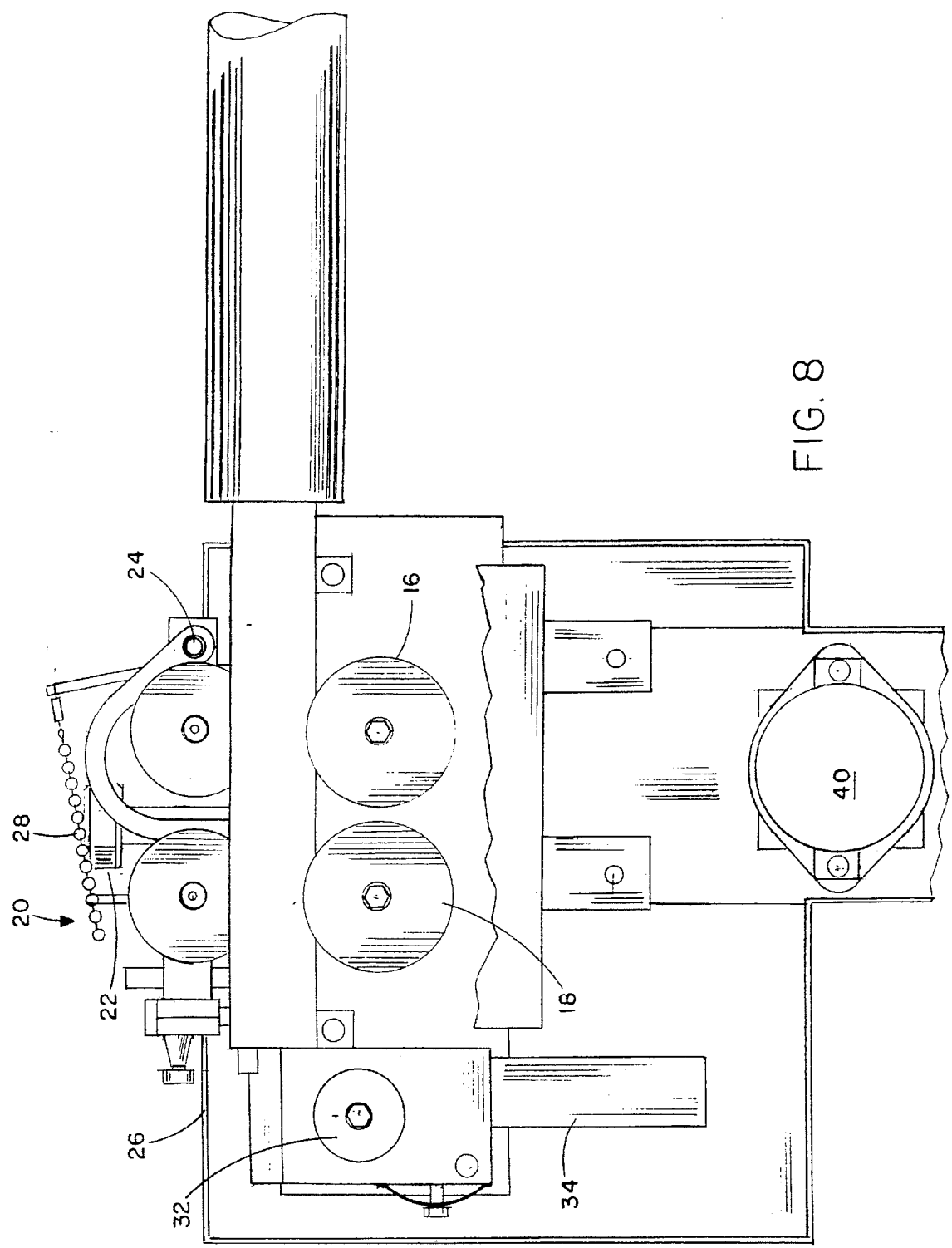
FIG. 8 is a front elevational view of the apparatus shown in FIG. 7.
Figure 9:
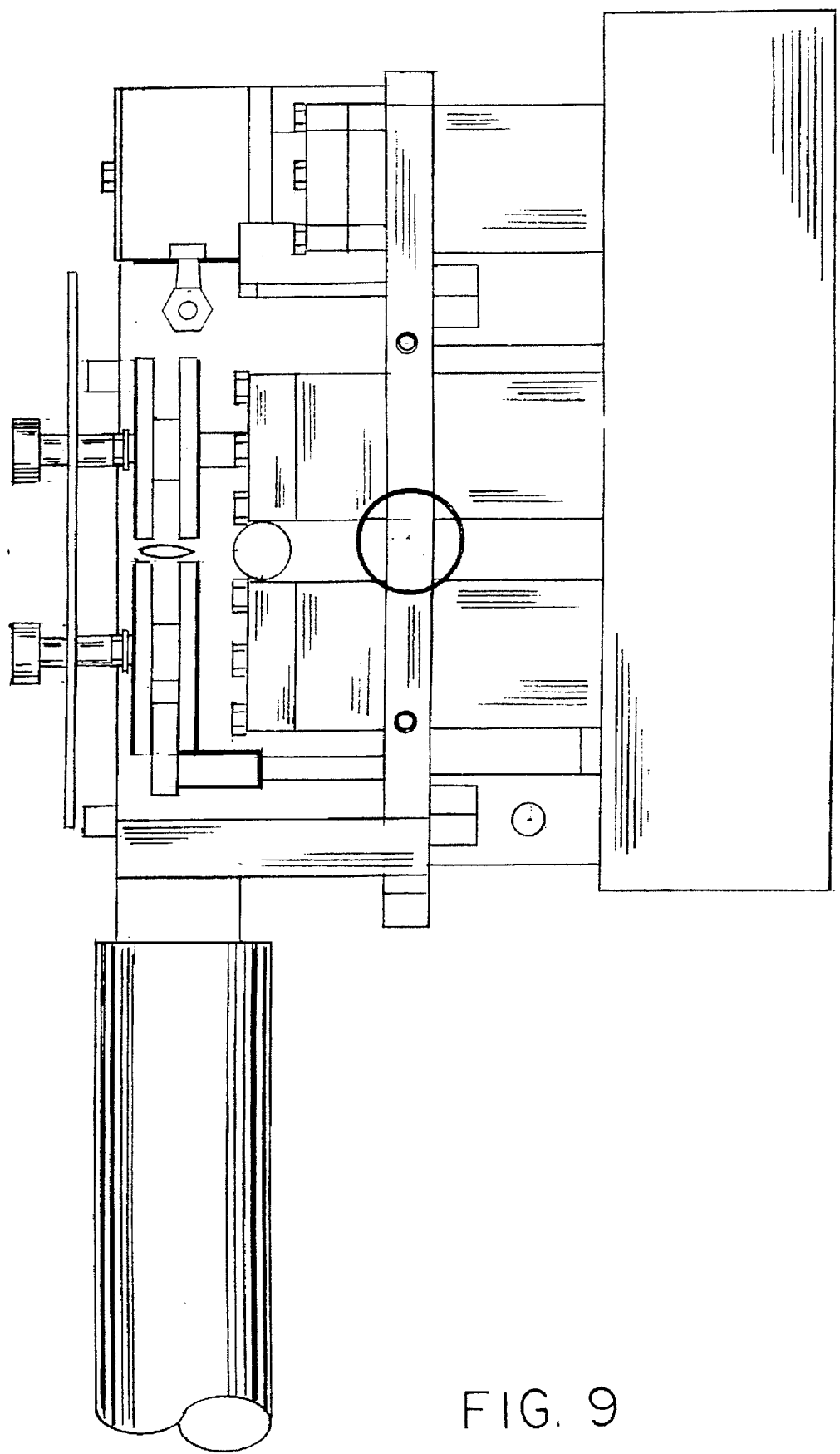
FIG. 9 is a plan view of the apparatus shown in FIGS. 7 and 8.

The apparatus 10 comprising the present invention is particularly adapted to expeditious and efficient cleaning by the quick release components utilized therein. The pivotal movement and removal of the hold down assembly 42 (FIGS. 3–5) enables the entire assembly to be submerged in cleaning fluid for rapid cleaning and reinstallment. The snap lock adjust on a front plate 44 is a similar convenient feature.

Although a preferred embodiment has been shown and described, it will be obvious to those skilled in the art that the details of construction of this embodiment may be modified without departing from the concept presented. It is, therefore, intended that the invention be limited only by the scope of the appended claims rather than by particular details of construction shown.

What is claimed is:

1. Apparatus for slitting casing surfaces and peeling the casings from a string of sausages and the like comprising: trackway means; driving means engaging the casing covered chain of sausages along the trackway means; means for continuously slitting the skin casings of a moving chain of sausages including a sausage contour follower slitting blade and limiting means, preventing the slitting blade from displacement from a casing surface when encountering casing surface irregularities; compressed air means directed against the slit casings to urge the skin casings away from the sausages; and removing means including vacuum means and an additional driving means engaging and moving the slit casings to a remote location, wherein the limiting means is a pin positioned adjacent the slitting blades to restrict upper movement of the blade when it engages an uneven casing surface and tends to rebound therefrom.

2. The apparatus as claimed in claim 1 wherein the slitting means further includes tensioning means holding the slitting blade against the casing surfaces under a preselected amount of pressure.

3. The apparatus as claimed in claim 1 wherein the driving means includes a second husking wheel cooperatively receiving the sausages and urging the string of sausages along the trackway means formed thereby.

4. The apparatus as claimed in claim 1 wherein the driving means includes a first husking wheel cooperatively receiving the sausages and urging the string of sausages along the trackway means formed thereby.

5. The apparatus as claimed in claim 1 wherein the trackway means includes a steam station through which the casing covered sausages move, the driving means includes a first husking wheel cooperatively receiving the sausages and urging the string of sausages along the trackway means formed thereby, the driving means includes a second husking wheel cooperatively receiving the sausages and urging the string of sausages along the continuation of the trackway formed thereby, and the slitting means further includes tensioning means holding the slitting blade against the casing surfaces under a preselected amount of pressure.

6. Apparatus for slitting casing surfaces and peeling the casings from a string of sausages and the like comprising: trackway means; driving means engaging the casing covered chain of sausages along the trackway means; means for continuously slitting the skin casings of a moving chain of sausages including a sausage contour follower slitting blade and limiting means, preventing the slitting blade from displacement from a casing surface when encountering casing surface irregularities; compressed air means directed against the slit casings to urge the skin casings away from the sausages; and removing means including vacuum means and an additional driving means engaging and moving the slit casings to a remote location, wherein the additional driving means includes a vacuum wheel cooperatively engaging the slit casings and moving the casings to the remote location and the limiting means is a pin positioned adjacent the slitting blade to restrict upward movement of the blade when it engages an uneven casing surface and tends to rebound therefrom.

7. The apparatus as claimed in claim 6 wherein the trackway means includes a steam station through which the casing covered sausage is moved, the driving means includes a first husking wheel cooperatively receiving the sausages and urging the string of sausages along the trackway means formed thereby, the driving means includes a second husking wheel cooperatively receiving the sausages and urging the string of sausages along the continuation of the trackway formed thereby, the slitting means further includes tensioning means holding the slitting blade against the casing surfaces under a preselected amount of pressure and the additional driving means includes a vacuum wheel cooperatively engaging the slit casings and moving the casings to the remote location.

8. The apparatus as claimed in claim 6 wherein the trackway means includes a steam station through which the casing covered sausage is moved, the driving means includes a first husking wheel cooperatively receiving the sausages and urging the string of sausages along the trackway means formed thereby, the driving means includes a second husking wheel cooperatively receiving the sausages and urging the string of sausages along the continuation of the trackway formed thereby, the slitting means further includes tensioning means holding the slitting blade against the casing surfaces under a preselected amount of pressure and the additional driving means is rotated at a speed greater than the rotational speed of the first and second pair of driving discs.

9. The apparatus as claimed in claim 7 further comprising idling means positioned adjacent the first and second husking wheels to maintain the chain of sausages in close proximity to the first and second pair of driving discs.

10. The apparatus as claimed in claim 9 wherein the vacuum wheel is rotated at a speed greater than the rotational speed of the first and second pair of driving discs.

11. The apparatus as claimed in claim 10 wherein the second husking wheel are rotated at a greater speed than the rotational speed of the first husking wheel.

* * * * *